SQUIRE M. ARMSTEAD'S
IMPROVED ANIMAL TRAP
72713
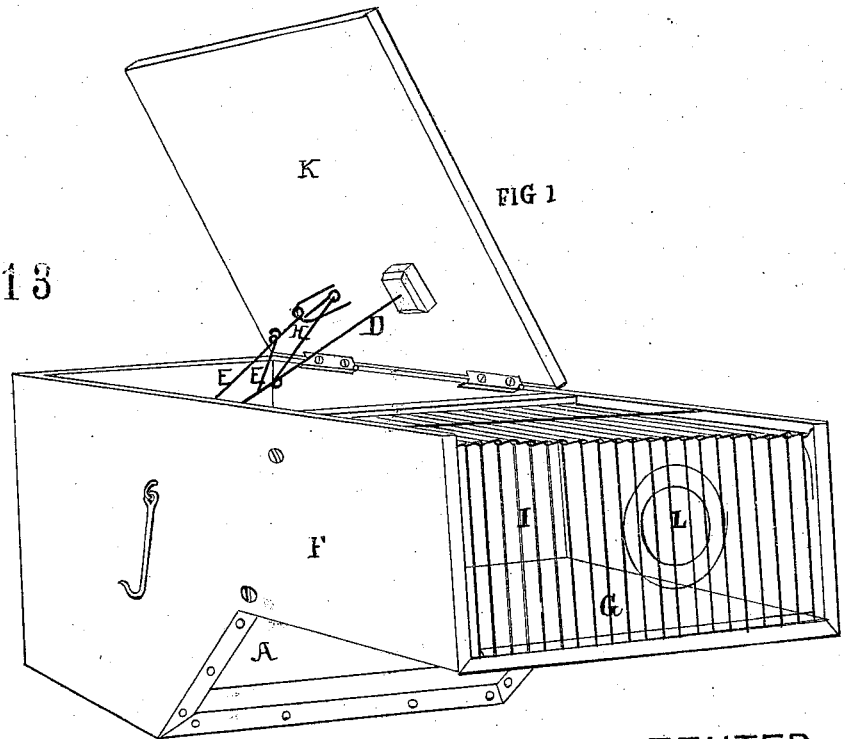
PATENTED
DEC 31 1867.
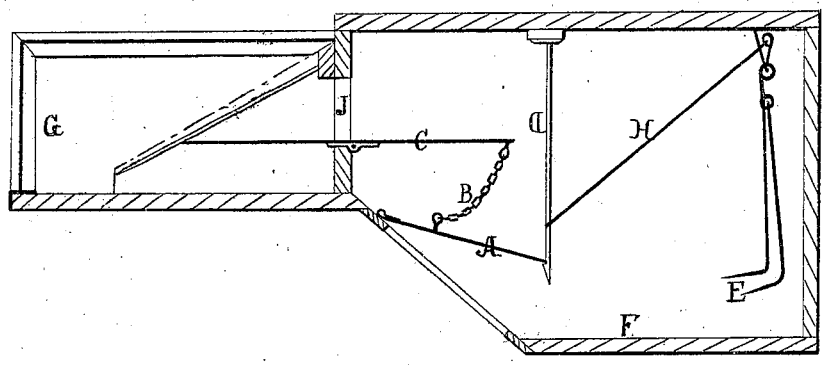

United States Patent Office.

SQUIRE M. ARMSTEAD, OF GRAND HAVEN, MICHIGAN.

Letters Patent No. 72,713, dated December 31, 1867.

IMPROVED ANIMAL-TRAP.

*The Schedule referred to in these Letters Patent and making part of the same.*

TO WHOM IT MAY CONCERN:

Be it known that I, SQUIRE M. ARMSTEAD, of Grand Haven, in the county of Ottawa, and State of Michigan, have invented a new and useful Animal-Trap; and I do declare that the following is a true and accurate description thereof, reference being had to the accompanying drawings, and to the letters of reference marked thereon, and making a part of this specification.

Figure 1 is a perspective view of my invention, with the top raised, showing the bait-hooks and their attachment to the top.

Figure 2 is an irregular longitudinal sectional view, showing the action of the spring upon the trap-door, and the treadle, and its connection with the spring.

In the construction of my invention, I use a rectangular box, F, of the shape shown in the drawing, with a partition, I. In this partition I make an opening, J, at the bottom of which I hang the treadle C, upon a proper fulcrum. This treadle is connected with a trap-door, A, by means of the chain or wire B. I fasten the spring-hook D to the cover or top K. I also attach to the cover the bait-hooks E E, to which is attached the rod H, which connects the bait-hooks with the spring-hook D. G is a cage, partitioned off from the box F by the partition I; L is a sliding door, through which to liberate the animal when required.

To use my invention, we will suppose the trap set, as in fig. 2, and the bait-hooks E E provided with proper inducements. A rat enters through the opening made by the trap-door being raised, and commences to nibble the cheese upon the bait-hooks. This causes the spring-hook to release the trap-door, which falls and closes the opening. The rat is then in a dark trap, and can only see light in one direction, and that is at the opening I, which leads into the cage. He springs on to the treadle C in order to reach the light; and, as he enters the cage, his weight depresses the other end of the treadle, and this treadle, being connected to the trap-door by the chain or wire B, raises the trap-door, when the spring-hook D catches and holds it up. After the rat has entered the cage G, the end of the treadle being released, resumes its horizontal position, with the end resting against the guard M, which prevents the rat from returning.

What I claim as my invention, and desire to secure by Letters Patent, is—

1. The method of raising the trap-door A by means of the connecting-chain B, and the treadle C, arranged substantially as described, for the purposes described.

2. The spring-hook D, and its attachment to the bait-hooks E E, operating substantially as described for the purpose indicated.

3. The combination of the trap-door A, the connecting-chain B, the treadle C, the spring-hooks D, and the bait-hooks E E, with the box F and cage G, arranged to operate substantially as set forth for the purposes designed.

S. M. ARMSTEAD.

Witnesses:
H. G. HANNAMAN,
H. F. EBERTS.